United States Patent
Hiraide

(10) Patent No.: US 10,466,493 B2
(45) Date of Patent: *Nov. 5, 2019

(54) VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,820

(22) Filed: Dec. 19, 2017

(65) Prior Publication Data

US 2018/0113318 A1   Apr. 26, 2018

Related U.S. Application Data

(63) Continuation of application No. 15/131,673, filed on Apr. 18, 2016, now Pat. No. 9,880,388, which is a
(Continued)

(30) Foreign Application Priority Data

Dec. 26, 2013  (JP) .................................. 2013-268725

(51) Int. Cl.
*G02B 27/01* (2006.01)
*G09G 5/00* (2006.01)
(Continued)

(52) U.S. Cl.
CPC ......... *G02B 27/0176* (2013.01); *G02B 27/01* (2013.01); *G02B 27/017* (2013.01);
(Continued)

(58) Field of Classification Search
CPC .. G02B 27/01; G02B 27/017; G02B 27/0172; G02B 27/0176; G02B 2027/0134;
(Continued)

(56) References Cited

U.S. PATENT DOCUMENTS

| 5,671,037 A | 9/1997 | Ogasawara et al. |
| 5,712,649 A | 1/1998 | Tosaki |

(Continued)

FOREIGN PATENT DOCUMENTS

| JP | H08-086974 A | 4/1996 |
| JP | 2006-201365 A | 8/2006 |

(Continued)

*Primary Examiner* — Collin X Beatty
(74) *Attorney, Agent, or Firm* — Oliff PLC

(57) ABSTRACT

By arranging cables, which transmit video signals to a pair of video image display elements arranged on the right side and the left side, along a frame for supporting a pair of right and left light guiding devices, it is possible to concentrate the cables on one of the right and left sides. That is, it is possible to integrally form the cables. By accommodating the cables in a cable cover portion, which extends along the frame, in a cover inside, it is possible to suppress an increase in size which accompanies cable arrangement and to implement the apparatus as a whole in a small body.

21 Claims, 9 Drawing Sheets

Related U.S. Application Data continuation of application No. 14/568,921, filed on Dec. 12, 2014, now Pat. No. 9,454,011.

(51) Int. Cl.
*H04N 13/332* (2018.01)
*H04N 13/344* (2018.01)

(52) U.S. Cl.
CPC ............ *G02B 27/0172* (2013.01); *G09G 5/00* (2013.01); *G02B 2027/015* (2013.01); *G02B 2027/0134* (2013.01); *G02B 2027/0138* (2013.01); *G02B 2027/0163* (2013.01); *G02B 2027/0178* (2013.01); *H04N 13/332* (2018.05); *H04N 13/344* (2018.05)

(58) Field of Classification Search
CPC ...... G02B 2027/015; G02B 2027/0178; G02B 6/00; G02B 6/0018; G02B 6/0031; G09G 3/003; G09G 5/00; H04N 13/0429; H04N 13/044; G03B 21/26
USPC ....... 359/471, 475, 507, 514, 567, 630, 631, 359/633, 636; 345/7–9, 204, 207, 633, 345/690, 699; 348/51, 121, 207.99, 348/240.25; 351/153
See application file for complete search history.

(56) References Cited

U.S. PATENT DOCUMENTS

| | | | |
|---|---|---|---|
| 6,762,885 B1 * | 7/2004 | Ogasawara | G02B 27/0176 345/8 |
| 6,771,424 B1 | 8/2004 | Amafuji et al. | |
| 7,447,330 B2 * | 11/2008 | Yamasaki | G02B 3/14 382/100 |
| 7,936,519 B2 | 5/2011 | Mukawa et al. | |
| 8,310,764 B2 * | 11/2012 | Tanijiri | G02B 5/0221 359/630 |
| 8,570,244 B2 | 10/2013 | Mukawa | |
| 8,907,865 B2 | 12/2014 | Miyawaki et al. | |
| 8,988,315 B2 | 3/2015 | Mukawa et al. | |
| 8,994,612 B2 * | 3/2015 | Fujishiro | G02B 27/0172 345/8 |
| 9,207,456 B2 | 12/2015 | Hiraide et al. | |
| 9,279,985 B2 | 3/2016 | Hiraide | |
| 9,454,011 B2 * | 9/2016 | Hiraide | G02B 27/0176 |
| 9,507,154 B2 | 11/2016 | Komatsu et al. | |
| 9,513,479 B2 | 12/2016 | Komatsu et al. | |
| 9,523,855 B2 * | 12/2016 | Hiraide | G02B 27/017 |
| 9,535,252 B2 * | 1/2017 | Hiraide | G02B 6/0053 |
| 9,880,388 B2 * | 1/2018 | Hiraide | G02B 27/0176 |
| 2013/0222896 A1 | 8/2013 | Komatsu et al. | |
| 2015/0177520 A1 | 6/2015 | Hiraide et al. | |
| 2015/0185477 A1 | 7/2015 | Hiraide | |
| 2015/0185481 A1 | 7/2015 | Hiraide | |
| 2016/0062126 A1 | 3/2016 | Hiraide et al. | |
| 2016/0187660 A1 | 6/2016 | Hiraide | |

FOREIGN PATENT DOCUMENTS

| | | |
|---|---|---|
| JP | 2007-214964 A | 8/2007 |
| JP | 4258950 B2 | 4/2009 |
| JP | 2013-083686 A | 5/2013 |
| JP | 2013-200553 A | 10/2013 |

\* cited by examiner

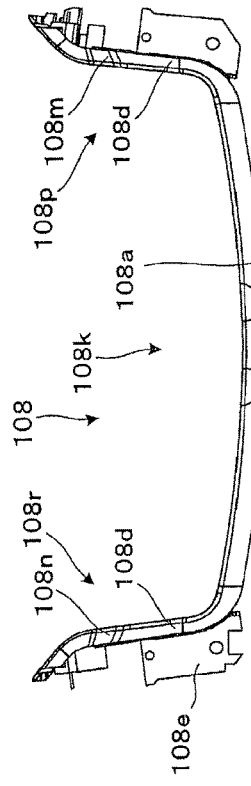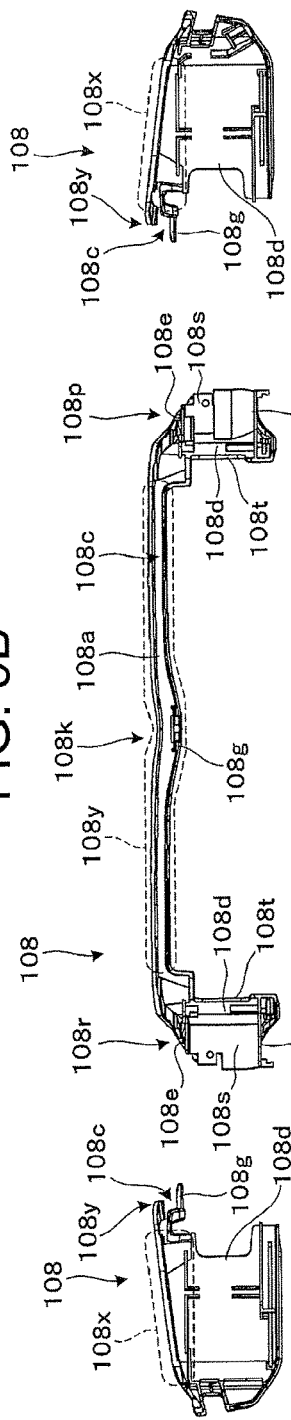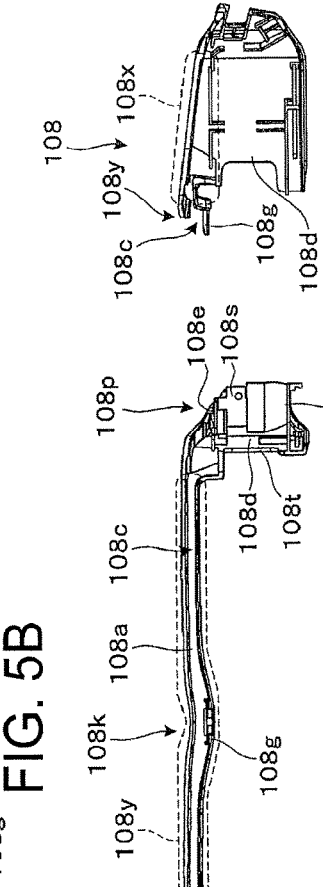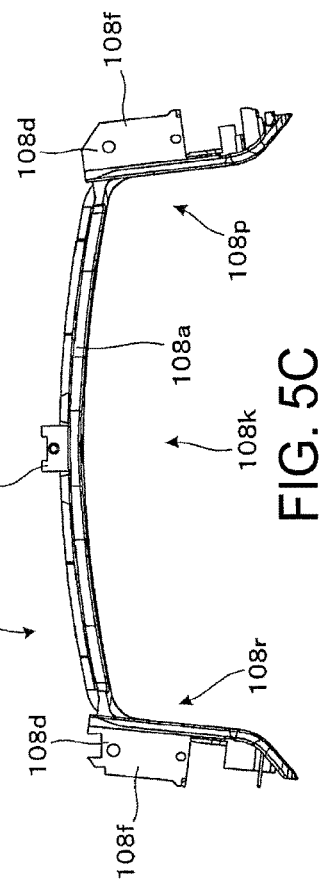

VIRTUAL IMAGE DISPLAY APPARATUS

CROSS-REFERENCE TO RELATED APPLICATIONS

This is a Continuation of application Ser. No. 15/131,673, filed Apr. 18, 2016, which is a Continuation of application Ser. No. 14/568,921 filed Dec. 12, 2014, which claims the benefit of Japanese Patent Application No. 2013-268725, filed Dec. 26, 2013. The disclosures of the prior applications are hereby incorporated by reference herein in their entirety.

BACKGROUND

1. Technical Field

The present invention relates to a virtual image display apparatus which is preferably applied to a head mount display for presenting a video image formed by an image display element and the like to a viewer.

2. Related Art

Various optical systems to be embedded in a virtual image display apparatus such as a head mount display (hereinafter, also referred to as an HMD) designed to be mounted on the head of a viewer have been proposed (see JP-A-2013-200553, for example).

In a case of a virtual image display apparatus which respectively forms and displays an image for the right eye and an image for the left eye, in particular, from among the virtual image display apparatuses such as an HMD (see JP-A-2013-200553), a configuration in which cables for transmitting (outputting) various signals such as a video image signal extend to the right side and the left side, that is, a configuration in which two cables are formed as a pair for the right side and the left side is considered.

However, it is desirable that the cables be integrally formed, that is, all the cables be extracted from one location instead of the state where two cables are provided on the right and left sides, from a viewpoint of facilitating wearing of the virtual image display apparatus and convenience in handling the virtual image display apparatus. In contrast, there is also a requirement for a decrease in size and weight of the apparatus even in the case where the cables are integrally formed.

In relation to virtual image display apparatuses such as an HMD, it is desirable that an increase in image angle be achieved while promoting the decrease in size and weight without degrading image quality. In addition, a new purpose such as virtual reality is produced by providing a see-through configuration in which an external image and a video image are presented in an overlapped manner, for example. That is, a display capable of displaying video image light in an overlapped manner without interrupting eyesight for the external world has been required. Under such circumstances, it is significantly important that cable arrangement does not bring about an increase in size of the apparatus and is not complicated for a user (viewer).

SUMMARY

An advantage of some aspects of the invention is to provide a virtual image display apparatus, which is configured of a pair of right and left display devices enabling viewing with both eyes, in which cables for transmitting signals to a pair of right and left video image elements can be integrally formed, and which can be implemented in a small body as a whole.

An aspect of the invention is directed to a virtual image display apparatus including: a pair of right and left video image elements which generate video image light; a pair of right and left light guiding members which respectively guide the video image light from the pair of right and left video image elements; a frame which supports the pair of right and left light guiding members; cables which output signals to the pair of right and left video image elements; and a cover which covers the cables, in which the cover extends along the frame, is engaged with the frame, and includes a cable cover portion for accommodating and arranging the cables along a direction in which the pair of right and left light guiding members are aligned.

According to the virtual image display apparatus, it is possible to concentrate a location where the cables start on one of the right and left sides by arranging, along the frame supporting the pair of right and left light guiding members, the cables for outputting various signals such as a video signal to the pair of video image elements arranged on the right and left sides, that is, it is possible to integrally form the cables. By accommodating the cables in the cable cover portion, which extends along the frame, in the cover at this time, it is possible to suppress an increase in size accompanying cable arrangement and to implement the apparatus as a whole in a small body.

In a specific aspect of the invention, the frame and the cable cover portion of the cover has structures which extend along the direction in which the cables are arranged. In such a case, it is possible to cause the frame and the cable cover portion to cooperate and to secure dust proofing and water proofing in the periphery of the cables by a fitting structure between the frame and the cable cover portion.

In another aspect of the invention, the cable cover portion of the cover includes, as an accommodating portion of the cables, a U-shaped accommodating groove portion which extends along the frame. In such a case, it is possible to reliably accommodate the cables by the accommodating groove portion with the U shape.

In still another aspect of the invention, the frame is made of metal, plastic, or carbon, and the cover is made of resin. For the frame made of metal, it is possible to use aluminum, titanium, magnesium, or the like. For the frame made of carbon, it is possible to use composite carbon obtained by laminating carbon woven cloths and solidifying the lamination with an adhesive, for example. That is, it is possible to produce the frame by cutting the composite carbon. In addition, it is also possible to produce the frame from plastic (high-rigidity grade). In such a case, it is possible to provide sufficient strength to the frame and to press, accommodate, and fix the cables, for example, in assembling components such as cables by providing flexibility to the cover to some extent.

In yet another aspect of the invention, the frame is arranged on a side relatively far from a position which is assumed to be a position of the eyes of a viewer, and the cable cover portion is arranged on a side relatively close to the position which is assumed to be the position of the eyes of the viewer. In such a case, it is possible to form a location where the cable cover portion of the cover and the frame are engaged or fitted so as to extend along the longitudinal direction of the frame and the cable cover portion, and to facilitate assembling the cable. In addition, the frame from among the frame and the cable cover portion can be arranged on a side on which the appearance of the frame can be easily viewed, namely on a side which is greatly exposed.

In still yet another aspect of the invention, a color of the frame is a relatively white-based color, and a color of the cover is a relatively black-based color. In this case, it is possible to suppress visual impression of an increase in size of the apparatus by a color contrast effect even in the case where the frame is positioned on a side on which the appearance of the frame can be relatively easily viewed and it is necessary to slightly increase the cable cover portion in size, for example.

In further another aspect of the invention, the cover integrally includes the cable cover portion and a pair of right and left optical system cover portions which extend from both ends of the cable cover portion and accommodate at least the pair of right and left video image elements in a pair of right and left optical systems. In this case, since the cable cover portion and the pair of right and left optical system cover portion are formed as one component in the cover, it is possible to reduce the number of members for assembling the cable cover portion and the optical system cover portion, for example, and it is possible to enhance a design property by forming an integrated body with no connecting portion.

In still further another aspect of the invention, the virtual image display apparatus further includes: a light transmitting member which is attached to the light guiding member and causes the viewer to visually recognize external light and the video image light in an overlapped manner. In this case, the light guiding member and the light transmitting member enable a see-through state where external light and the video image light are overlapped.

In yet further another aspect of the invention, the light guiding member includes four or more surfaces as a plurality of optical surfaces such that a first surface and a third surface from among the plurality of optical surfaces are arranged to face each other, in which the video image light from the video image elements may be fully reflected by the third surface, is fully reflected by the first surface, is reflected by the second surface, then transmits through the first surface, and reaches a viewing side, and in which the first surface and the third surface of the light guiding member is substantially parallel planes. In this case, it is possible to obtain substantially zero diopter scale of the external light which transmits through the first surface and the third surface and is observed, and particularly, it is possible to obtain substantially zero appearance magnification error of an external image and to obtain a state close to a naked eye state.

BRIEF DESCRIPTION OF THE DRAWINGS

The invention will be described with reference to the accompanying drawings, wherein like numbers reference like elements.

FIG. 5A is a front view of a cover inside, FIG. 5B is a planar view, FIG. 5C is a bottom view, FIG. 5D is a left side view, and FIG. 5E is a right side view.

DESCRIPTION OF EXEMPLARY EMBODIMENTS

Hereinafter, a detailed description will be given of an embodiment of a light guiding device and a virtual image display apparatus, which includes the light guiding device, according to the invention with reference to FIG. 1.

Figure 1:
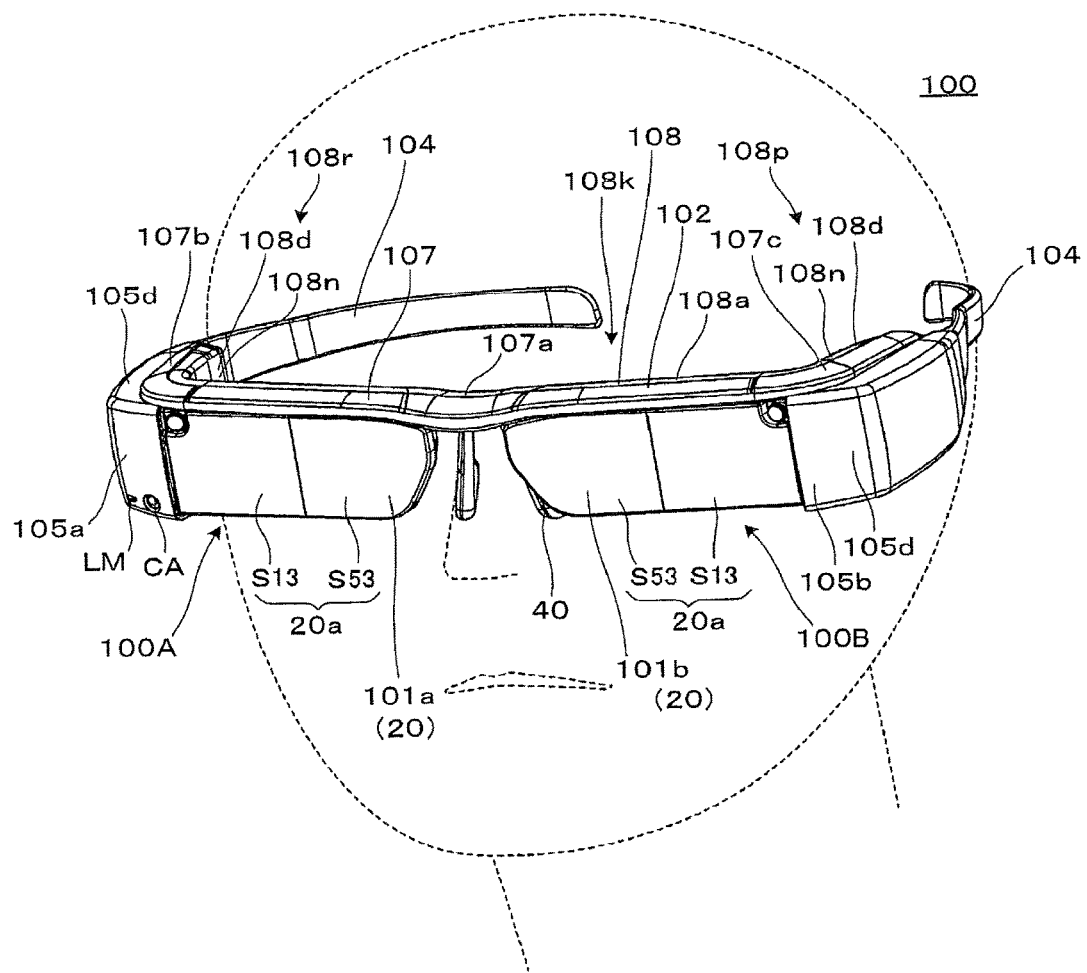
FIG. 1 is a perspective view simply illustrating an appearance of a virtual image display apparatus according to an embodiment of the invention.

As shown In FIG. 1, a virtual image display apparatus 100 including a light guiding device according to the embodiment is a head mount display which has an appearance like glasses, can be viewed by a pair of right and left eyes, can cause a viewer or a user who wears the virtual image display apparatus 100 to visually recognize image light (video image light) by a virtual image, and can cause the viewer to visually recognize or view an external image in a see-through manner.

The virtual image display apparatus 100 is provided with first and second optical members 101a and 101b which cover front sides of the eyes of the viewer, a frame portion 102 which supports both the optical members 101a and 101b, and first and second image formation main body portions 105a and 105b which are applied from both right and left ends of the frame portion 102 to temples 104 on the rear side. Here, a first display device 100A as a combination of the first optical member 101a and the first image formation main body portion 105a on the left side in the drawing is a portion for forming a virtual image for the right eye, and also functions alone as a virtual image display apparatus. In addition, the virtual image display apparatus 100 includes a small-sized camera CA which can perform an imaging operation at a side portion and further has a display lamp LM, which indicates that the camera CA is being operated, near the camera CA. In addition, a second display device 100B as a combination of the second optical member 101b and the second image formation main body portion 105b on the right side in the drawing is a portion for forming a virtual image for the left eye and also functions alone as a virtual image display apparatus.

Figure 2:
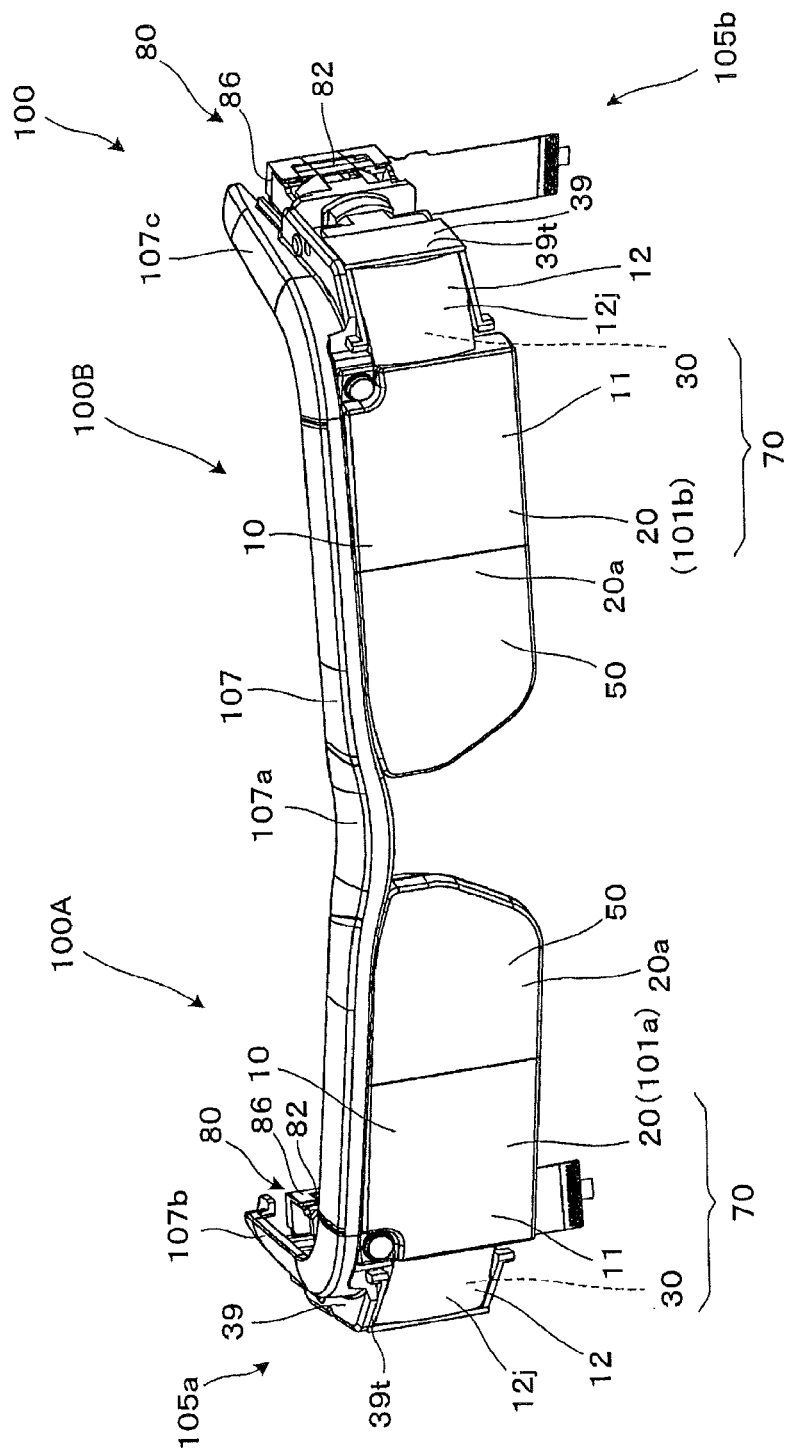
FIG. 2 is a perspective view showing an internal structure of the virtual image display apparatus from which external accessory members are removed.

FIG. 2 shows an internal structure of the virtual image display apparatus 100, and an appearance and inside of the virtual image display apparatus 100 are contrasted by comparing FIG. 2 with FIG. 1. For example, each of the first and second image formation main body portions 105a and 105b is configured of a projector lens 30 which is accommodated in a lens barrel portion 39 and a pair of right and left image display devices 80 including a video image display element (video image element) 82.

As shown in the respective drawings from FIG. 1 to FIG. 4 for the appearance and the inside, the frame portion 102 provided in the virtual image display apparatus 100 is provided with a frame 107 arranged on the upper end side and a cover inside 108 as a cover including a cable cover portion 108a arranged along the frame 107 on the rear side thereof. The cable cover portion 108a which configures the cover inside 108 is arranged so as to extend in a traverse direction, in which the eyes are aligned, at the center. Furthermore, the cable cover portion 108a is a member made of a flexible resin material, for example, accommodates cables therein, covers the cables, enables cable arrangement from the left eye side to the right eye side (or in the opposite direction), and concentrates a signal transmission source of the cables on one location as will be described later. According to the embodiment, an example in which end portions of the cables (that is, connecting portions to other members such as a transmission source) are concentrated on one location on the left eye side will be described.

The virtual image display apparatus 100 has a configuration in which a frame-shaped portion is not provided on the lower side. The frame 107 which configures the frame portion 102 is a long plate-shaped member which is bent into a U shape and is provided with a front portion 107a extending in the right-left traverse direction corresponding to the eye alignment of the viewer, and a pair of side portions 107b and 107c extending in a depth direction corresponding to the front-back direction of the viewer. The frame 107, namely the front portion 107a and the side portions 107b and 107c are an integrated component made of metal, which is formed of a metal material such as die casting aluminum, or an integrated component of composite carbon. As a material of the frame 107, it is possible to use aluminum, titanium, or magnesium, for example, in the case of the frame 107 made of metal. It is also possible to produce the frame 107 made of carbon by laminating carbon cloth, for example, and cutting composite carbon solidified with an adhesive. In addition, it is also possible to create the frame 107 from plastic (high-rigidity grade). A cable cover portion 108a which configures the cover inside 108 as a resin portion is arranged in a further inner side than the frame 107, that is, on a side close to the viewer along the frame 107 and can be engaged with the frame 107. Particularly, since the cable cover portion 108a is fitted to the frame 107, that is, the frame 107 and the cover inside 108 have fitting structures here, the cable cover portion 108a can accommodate various cables for image formation in cooperation therewith. In the frame 107, a width of the front portion 107a and the cable cover portion 108a in the depth direction is substantially the same as the thickness or the width of the light guiding device 20 corresponding to the first and the second optical members 101a and 101b. On the left side of the frame 107, specifically at a portion from the left end portion to the side portion 107b when viewed from a front direction of the front portion 107a, the first optical member 101a and the first image formation main body portion 105a are aligned and supported by being directly fixed by screwing, for example. On the right side of the frame 107, specifically, at a portion from the right end portion to the side portion 107c when viewed from the front direction of the front portion 107a, the second optical member 101b and the second image formation main body portion 105b are aligned and supported by being directly fixed by screwing, for example. In addition, the first optical member 101a and the first image formation main body portion 105a are aligned by being fitted to each other, and the second optical member 101b and the second image formation main body portion 105b are aligned by being fitted to each other.

The frame 107 and the cover inside 108 which configure the frame portion 102 play not only a role in supporting the first and second image formation main body portions 105a and 105b but also a role in protecting the inside of the first and second image formation main body portions 105a and 105b in cooperation with a cover-shaped external accessory member 105d which covers the first and second image formation main body portions 105a and 105b. In addition, the frame 107 is separated from or is in loose contact with the first and second optical members 101a and 101b which are coupled to the first and second image formation main body portions 105a and 105b or an upper portion except for the root side of the pair of right and left light guiding devices 20. For this reason, even if there is a difference in thermal coefficients between the light guiding devices 20 at the center and the frame portion 102 including the frame 107, expansion of the light guiding devices 20 in the frame portion 102 is allowed, and it is possible to prevent strain, deformation, and breakage from occurring in the light guiding device 20.

The cover inside 108 is a cover including the cable cover portion 108a which is arranged at a center 108k as described above and a pair of optical system cover portions 108d which are arranged in right and left peripheral portions 108r and 108p extending from both ends of the cable cover portion 108a. In addition, the cover inside 108 is a member which is integrally molded by injection molding, for example, and is made of resin. Since the cable cover portion 108a and the pair of right and left optical system cover portion 108d are integrated to form one component in the cover inside 108, it is possible to reduce members for assembling the cable cover portion 108a and the optical system cover portion 108d, for example, and to enhance a design property by forming the cable cover portion 108a and the optical system cover portions 108d as an integrated body with no connecting portion.

The optical system cover portion 108d accommodates the first and second image formation main body portions 105a and 105b as a pair of right and left optical systems. Specifically, the optical system cover portion 108d plays a role in supporting the image display device 80 and the projector lens 30, which configure the first image formation main body portion 105a, from the inside and protecting the inside of the first and second image formation main body portions 105a and 105b in cooperation with the cover-shaped external accessory member 105d.

In addition, a nose receiving portion 40 is additionally provided in the frame portion 102. The nose receiving portion 40 plays a role in supporting the frame portion 102 by abutting on the nose of the viewer. That is, the frame portion 102 is arranged in front of the viewer by the nose receiving portion 40 supported at the nose and the pair of temples 104 supported at the ears. The nose receiving portion 40 is fixed to the front portion 107a of the frame 107, which is a component configuring the frame portion 102, by screwing (a detailed description will be given later). In addition, the appearance described above with reference to FIG. 1 is an example, and designs for portions which are not directly involved in the optical mechanism, such as a mechanism for fixing screws, can be appropriately changed.

As shown in FIG. 2 and the like, it is possible to understand that the first display device 100A is provided with a perspective projection device 70 as an optical system for projection and an image display device 80 which forms video image light. The perspective projection device 70 plays a role in projecting an image formed by the image display device 80 as a virtual image to the eyes of the viewer.

The perspective projection device 70 is provided with a first optical member 101a or the light guiding device 20 and the projector lens 30 for image formation. The first optical member 101a or the light guiding device 20 are configured of a light guiding member 10 for light guiding and visualization and a light transmitting member 50 for visualization. In addition, the first image formation main body portion 105a is configured of the image display device 80 and the projector lens 30. The projector lens 30 which is configured of a group of lenses is accommodated in the lens barrel portion 39 and is fixed at an end portion 39t of the lens barrel portion 39 in a state of being precisely positioned by fitting with respect to the light guiding device 20.

The image display device 80 includes a video image display element (video image element) 82 as a transmissive space light modulation device, an illumination device (not shown) as a backlight which emits illumination light to the video image display element 82, and a drive control unit (not shown) which controls operations of the video image display element 82 and the like as will be described in detail later.

The light guiding device 20 is configured of the light guiding member 10 for light guiding and visualization and the light transmitting member 50 for visualization as described above. The light guiding member 10 is a part of the prism-type light guiding device 20 and an integrated member, and can be separately understood as a first light guiding portion 11 on the light outgoing side and a second light guiding portion 12 on the light incident side. The light transmitting member 50 is a member (assistant optical block) which assists the visualization function of the light guiding member 10 and forms a light guiding device 20 by being integrally fixed to the light guiding member 10. By fitting an end portion 12j of the light guiding device 20 with the aforementioned configuration, which is positioned on the light source side (root side) to the end portion 39t of the lens barrel portion 39, the light guiding device 20 is precisely positioned with respect to the projector lens 30 and is fixed thereto.

Here, a first exposed surface 20a as a front (outside) exposed surface and a second exposed surface 20b as a rear (inside) exposed surface among the optical surfaces which configure the light guiding device 20 are portions which are exposed to the outside and have an influence on the see-through function as shown in FIGS. 1, 2, and 3A to 3C, for example. The first exposed surface 20a is configured of a third surface S13 from among the optical surfaces of the light guiding member 10 and a third transmitting surface S53 as an optical surface of the light transmitting member 50, and the second exposed surface 20b is configured of a third surface S11 and a fourth surface S14 from among the optical surfaces of the light guiding member 10 and a first transmitting surface S51 from among the optical surfaces of the light transmitting member 50.

Figure 3C:
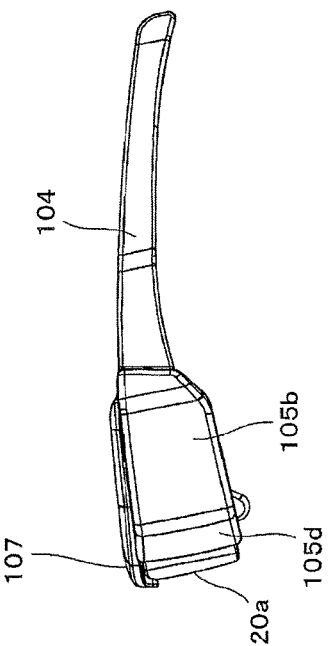
FIG. 3C is a side view thereof.
Figure 3A:
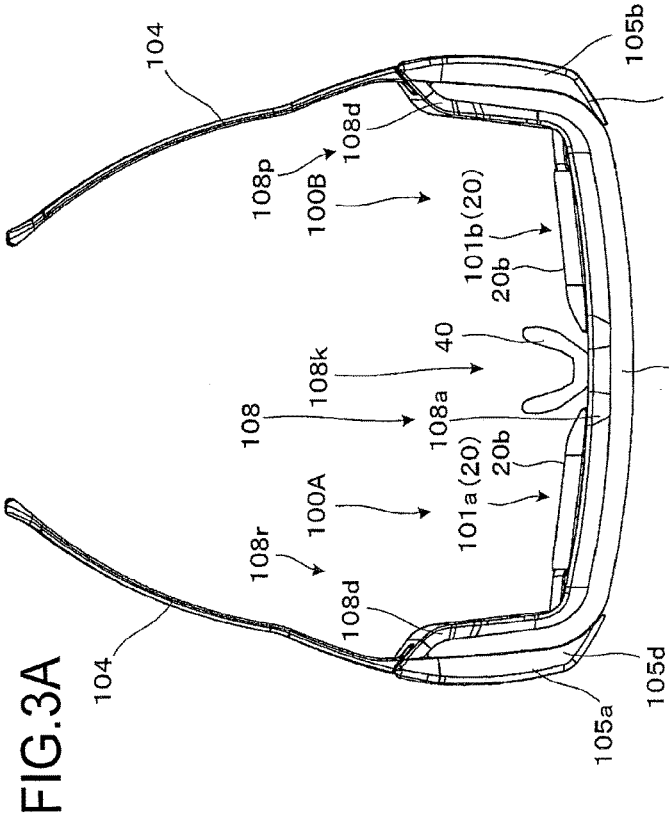
FIG. 3A is a planar view showing the appearance of the virtual image display apparatus.
Figure 3B:
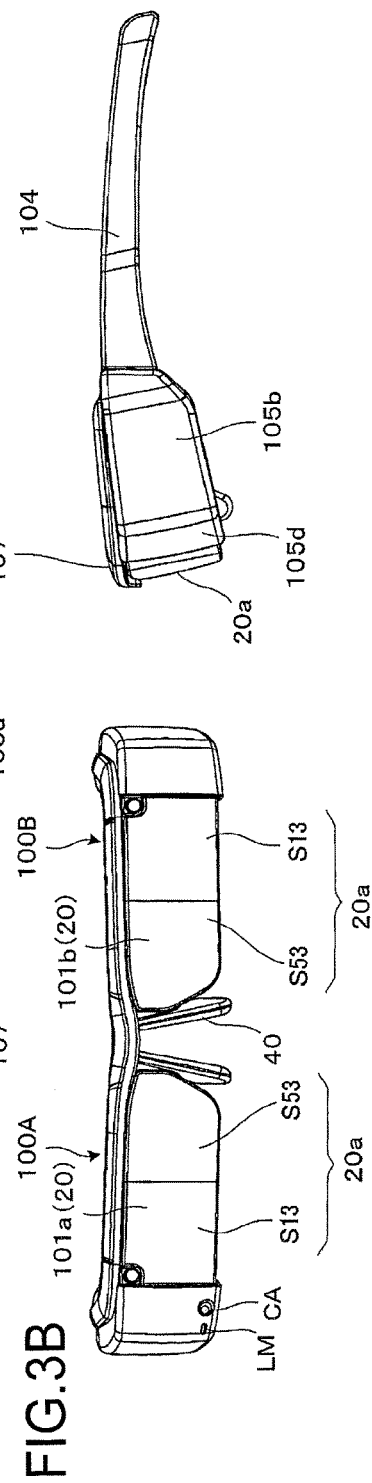
FIG. 3B is a front view thereof.

As for the arrangement of the frame 107 and the cover inside 108 which configure the frame portion 102, the frame 107 is arranged on the relatively front side, and the cable cover portion 108a of the cover inside 108 is arranged on the relatively rear side as shown in FIG. 3A. In other words, the frame 107 made of metal is arranged on a relatively far side from the position which is assumed to be a position of the eyes of the viewer, and the cable cover portion 108a made of resin is arranged on a relatively close side to the position which is assumed to be a position of the eyes of the viewer. As for color arrangement, it is possible to form the frame 107 by applying white-based coating while forming the cable cover portion 108b by applying black-based coating or using a black-based material. With such a configuration, it is possible to suppress visual impression of an increase in size of the apparatus in the case where it is necessary to slightly increase the cable cover portion 108a in size due to the size of the cable to be accommodated therein, for example.

Figure 4:
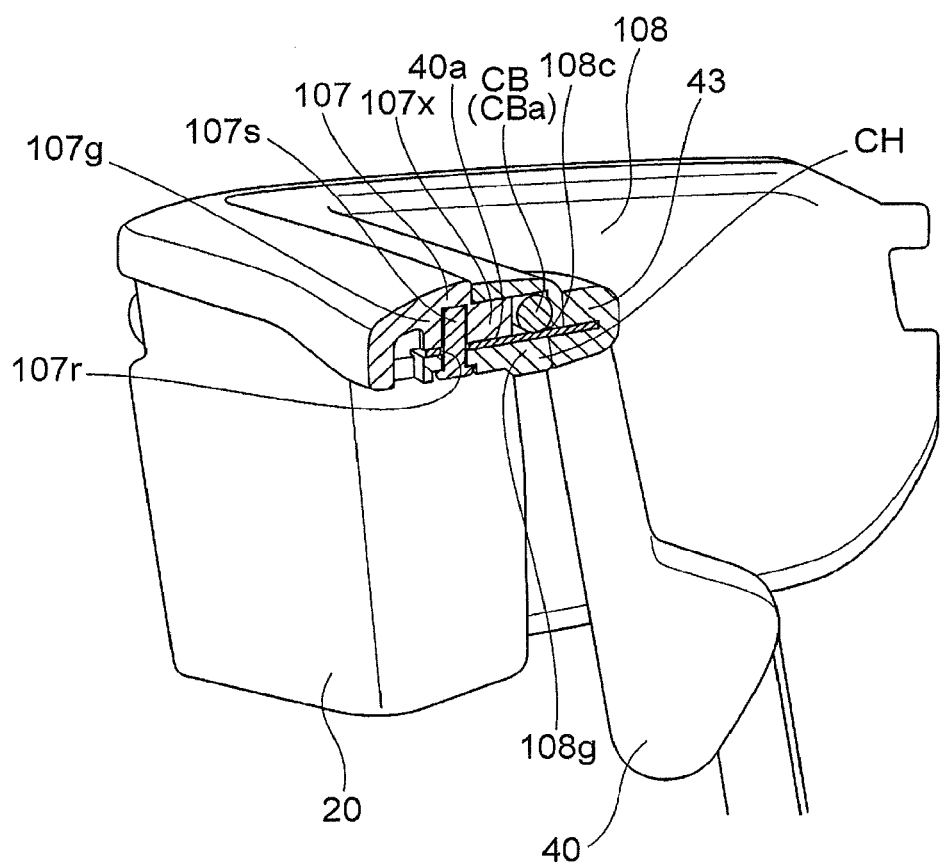
FIG. 4 is a side cross-sectional view of the virtual image display apparatus at the center thereof.

Hereinafter, a description will be given of a structure and the like of the frame portion 102, in which cables CB are assembled, with reference to FIG. 4 and the like. FIG. 4 is a side cross-sectional view of a virtual image display apparatus 100 in a state where the cables CB are assembled therein when cut at the center. As shown in the drawing, the cable cover portion 108a which configures the cover inside 108 extends along the frame 107, is engaged with the frame 107, and accommodates and arranges the cables CB along a direction, in which the pair of right and left light guiding devices 20 are aligned, in the frame portion 102. For this reason, the cable cover portion 108a includes an accommodating groove portion 108c capable of accommodating a coupling cable portion CBa (see FIG. 4 or 6A) as a portion, which is made to extend from the left side to the right side (or in the opposite direction), in particular, in the cables CB. The accommodating groove portion 108c has a U shape in a cross-sectional view. The cables CB are wiring cables including cables for outputting signals required for the image formation and function as wiring cables which appropriately transmit and receive image signals from a controller (not shown) for providing instructions from the viewer and other signals to a camera CA and a display lamp LM (see FIG. 1 and the like). The outermost portion of the cables is formed of a flexible member (deformable member) including a plurality of cores, and the cables CB are accommodated in a state where the coupling cable CBa is slightly deformed and fixed to the inside of the accommodating groove portion 108c along the frame 107 by being pressed into the cable cover portion 108a made of resin, for example.

Hereinafter, a description will be given of the nose receiving portion 40 which is additionally provided in the frame portion 102 as a peripheral structure of the frame portion 102 except for the cable cover portion 108a shown in FIG. 4. The nose receiving portion 40 is fixed at a center portion 107g of the front portion 107a of the frame 107 of the frame portion 102 by screwing and extends downward. The nose receiving portion 40 includes a fixed portion 43 at a center upper portion, a pair of length adjustment members extends upward and downward, and pad portions which are formed at a tip end of the adjustment members. The fixed portion 43 is a portion for stably fixing the nose receiving portion 40 to the frame 107. A core metal 40a which is partially exposed from the fixed portion 43 is interposed between the center portion 107g of the frame 107 and an apex portion CH of a connecting portion (connecting region) 108g provided at the center of the cover inside 108, and is fastened and fixed together with a screw 107s which is screwed into a screw hole 107r at the front portion 107a. In the frame portion 102, the structure for arranging the cables CB, such as the accommodating groove portion 108c, is formed at a position at which the structure does not affect peripheral structures such as the nose receiving portion 40 as described above.

Hereinafter, a detailed description will be given of a structure of the cover inside 108 with which the cables CB are assembled, with reference to FIG. 5A and the like. Although the cover inside 108 is a member which is integrally molded by injection molding as described above and is made of resin, it is possible to separately understand the cover inside 108 as three portions in terms of functions and the like. That is, the cover inside 108 is configured of the center portion 108k including the cable cover portion 108a for causing the cable CB to extend from the left eye side to the right eye side and a pair of right and left peripheral portions 108r and 108p including the optical system cover portion 108d for accommodating the pair of optical systems as shown in the respective drawings from FIGS. 5A to 5E. From among the portions, the center portion 108k is provided between the peripheral portions 108r and 108p arranged at both ends and also plays a role as a bridge portion which connects the peripheral portions 108r and 108p. In addition, the connecting portion 108g which enables the assembly of the nose receiving portion 40 in addition to the cable cover portion 108a is provided at the center portion 108k so as to have a plate shape projecting from the center thereof. In addition, the pair of right and left peripheral portions 108r and 108p are provided with side wall portions 108m and 108n, which support the optical system cover portion 108d and form inner surface portions to be positioned at positions close to the viewer, in addition to the pair of optical system cover portions 108d as described above. In addition, the side wall portions 108m and 108n are fitted to the side portions 107b and 107c (see FIG. 1) of the frame 107. Moreover, each of the pair of optical system cover portions 108d includes an upper portion 108e, a side portion 108t, and a bottom portion 108f and functions as a lens barrel portion cover portion which supports and fixes the lens barrel portion 39 for accommodating the projector lens 30.

Figure 6A:
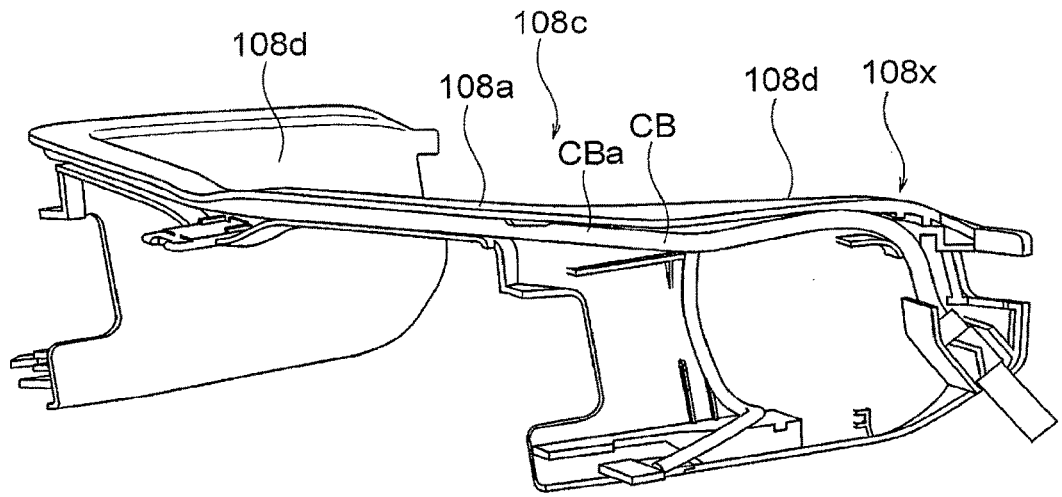
FIG. 6A is a perspective view showing a state where cables are arranged in the cover inside.

In addition, the cover inside 108 has various structures for further securing the arrangement of the cables CB (see FIG. 6A and the like). As shown in FIG. 5A, for example, the cable cover portion 108a includes a U-shaped accommodating groove portion 108c for accommodating the cables CB, and a fitting portion 108y for fitting the cover inside 108 to a rib 107x with a convex shape (see FIG. 4), which projects toward the face side of the viewer, in the frame 107 by extending toward the frame 107 (see FIG. 3A and the like) is formed at the tip end portion of the accommodating groove portion 108c. That is, the frame 107 and the cover inside 108 have a fitting structure. By providing such a fitting structure, it is possible to achieve dust proofing and water proofing for the inside of the frame portion 102. In addition, a guide groove 108x for arranging the cables CB is formed at the pair of peripheral portions 108r and 108p. By arranging the cables CB along the cable cover portion 108a and the guide groove 108x, the cables CB are accommodated without causing an increase in size and affecting image formation and the see-through property.

Figure 6B:
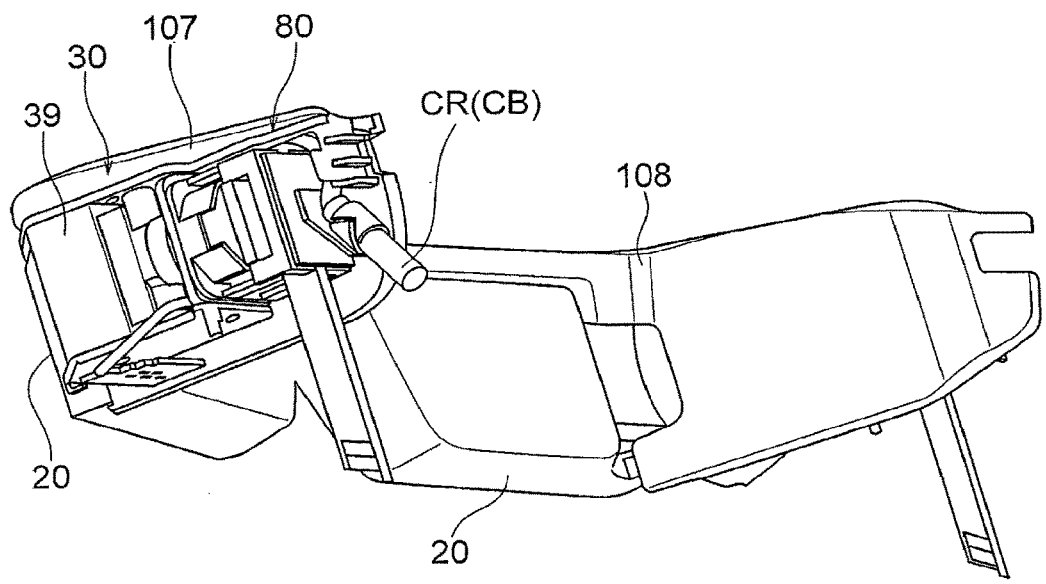
FIG. 6B is a diagram showing a state where a frame with a light guiding device and a projector lens fixed thereto is assembled in the state of FIG. 6A.

With the structure as described above, the cover inside 108 can reliably accommodate and fix the cables CB as shown In FIG. 6A, for example. In contrast, in relation to the assembly of the optical system, it is possible to assemble the light guiding device 20, the projector lens 30, and the like with the frame 107 separately from the cables CB as will be described later with reference to FIG. 7, for example. Therefore, for assembling the internal structure including the cables CB and the optical system as shown in FIG. 6B, the cables CB may be assembled with the cover inside 108 first as shown in FIG. 6A, the optical system including the light guiding device 20 may be separately assembled with the frame 107, and the cover inside 108 with which the cable CB is assembled may then be fitted to the frame 107 with which the optical system including the light guiding device 20 is assembled, and the respective end portions of the cables CB may finally be connected to the image display device 80 and the like. As shown in FIGS. 6A and 6B, the tip ends of the cables CB are concentrated at a single location of the cable fixing portion CR on the left eye side according to the embodiment.

Figure 7:
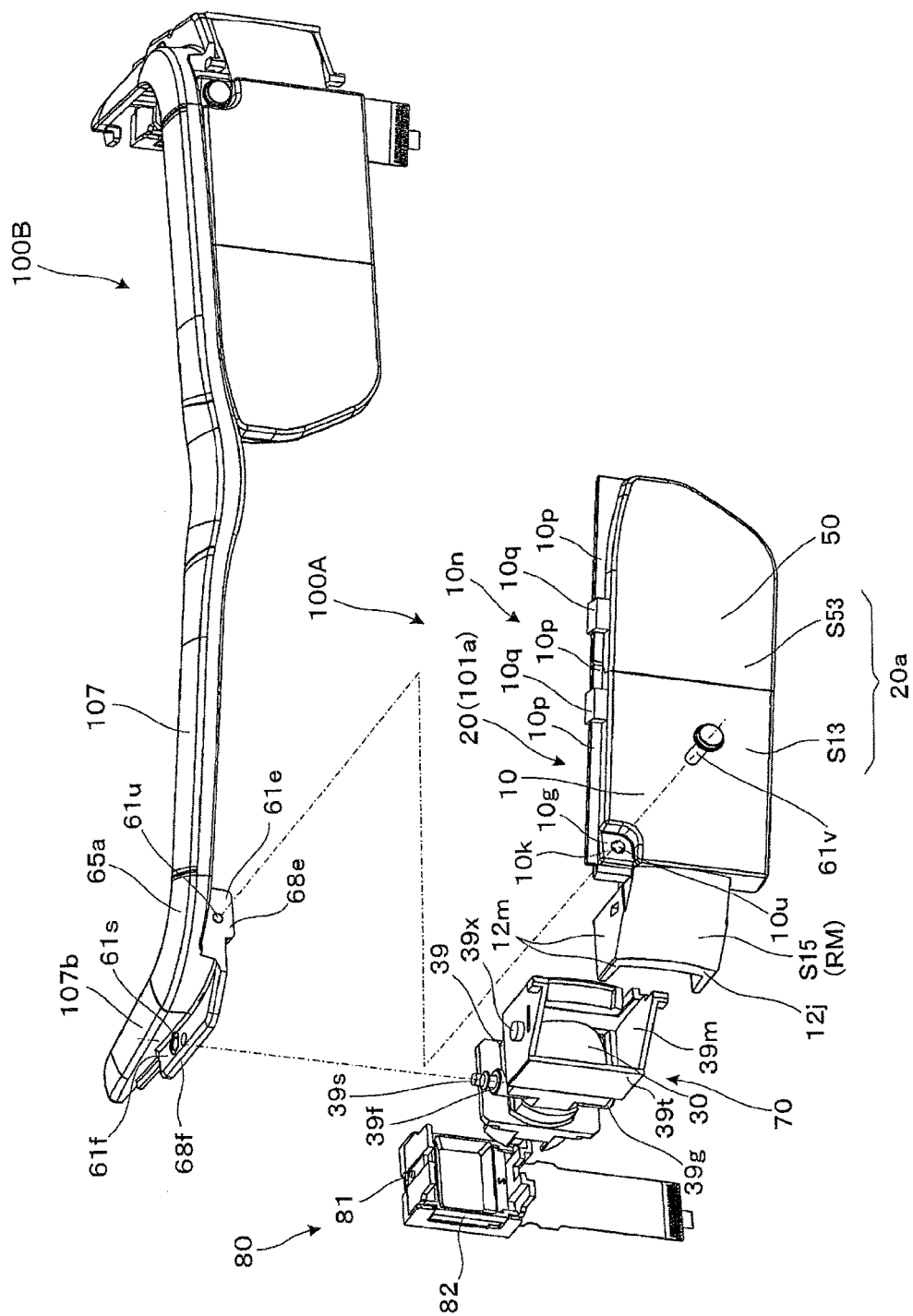
FIG. 7 is an exploded perspective view showing a state where the light guiding device and the projector lens in the virtual image display apparatus are fixed to the frame.

Hereinafter, a description will be given of assembly of the first display device 100A, which is configured of the light guiding device 20, the projector lens 30, and the like, to the frame 107 with reference to FIG. 7. The projector lens 30 which configures the first image formation main body portion 105a is directly fixed to a first fixation portion 61f, which is provided at a side end portion 65a (or a metal portion of the side portion 107b) of the frame 107, by using an attachment portion 39g formed so as to be embedded in the lens barrel portion 39 for accommodating the projector lens. In the fixation, alignment is achieved by a rear surface 68f of the first fixation portion 61f abutting an upper end surface 39f and the like of the attachment portion 39g, and reliable detachable fixation can be made by screwing a screw 39s into a hole 61s. At this time, a boss 39x provided at the lens barrel portion 39 is fitted into a boss hole (not shown) in the frame 107, rotation of the lens barrel portion 39 is restricted, and positioning in relation to the rotation is also performed. In contrast, the light guiding device 20 as the first optical member 101a is directly fixed to a second fixation portion 61e provided at a side end portion 65a (or a metal portion of the side portion 107b) of the frame 107 by using an attachment portion 10g formed at a neck portion or a stepped portion of the light guiding device 20. The attachment portion 10g is provided by using a corner of the first light guiding portion 11 on the incident side of the light guiding device 20, at a portion on the light incident side, specifically in the periphery of the boundary between the first light guiding portion 11 and the second light guiding portion 12. In such a fixation, alignment is achieved by an abutting surface 68e, which is provided at the front portion of the second fixation portion 61e, abutting a rear surface 10k of the attachment portion 10g, and reliable detachable fixation can be made by screwing a screw 61v into a screw hole 61u via a screw hole 10u.

Figure 8A:
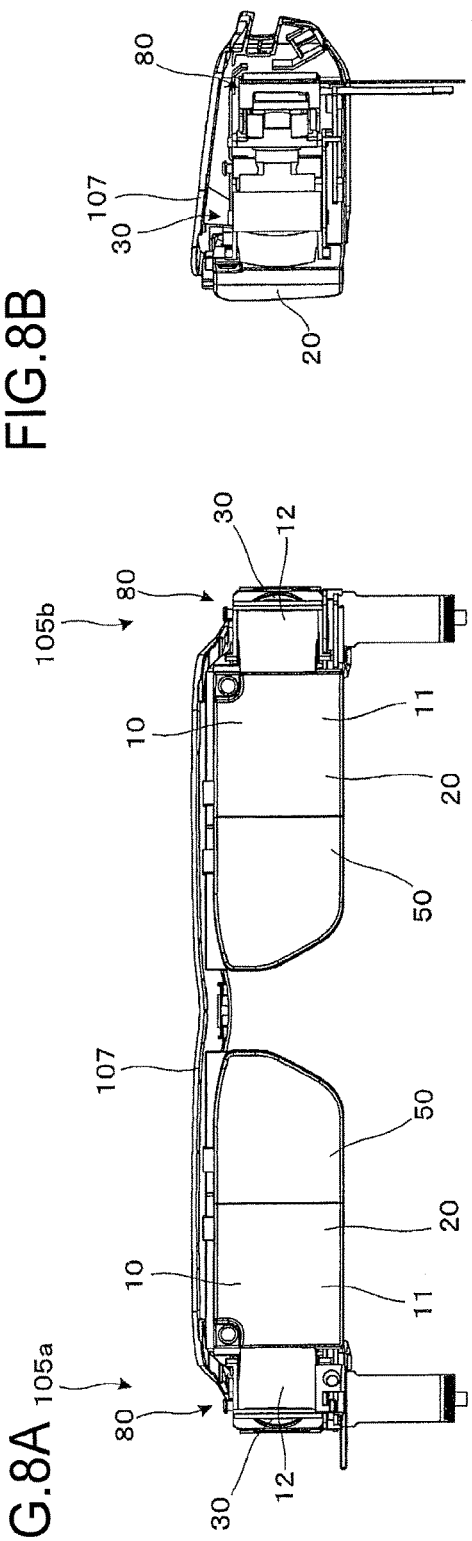
FIG. 8A is a front view showing a state where another optical system is assembled in a state where no cables are arranged in the cover inside.
Figure 8B:
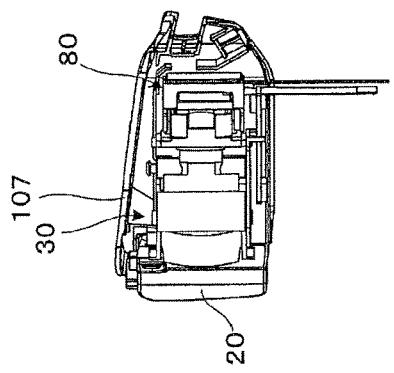
FIG. 8B is a side view.
Figure 8C:
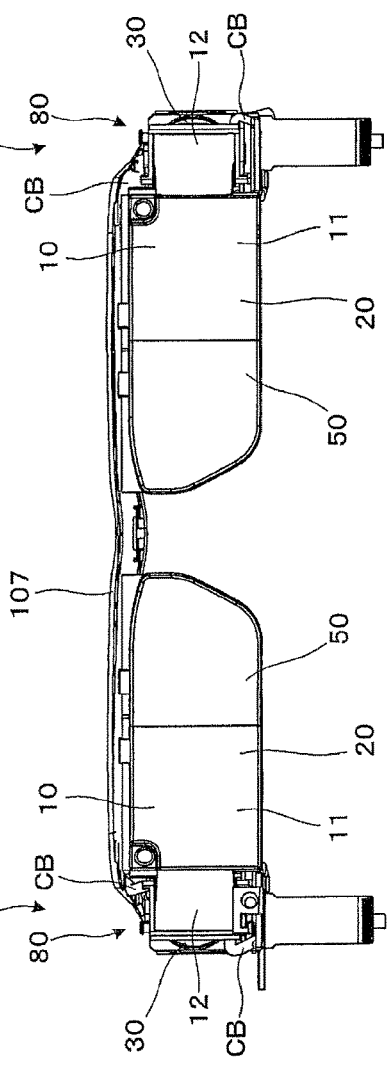
FIG. 8C is a front view showing a state where another optical system is assembled in a state where the cables are arranged in the cover inside.
Figure 8D:
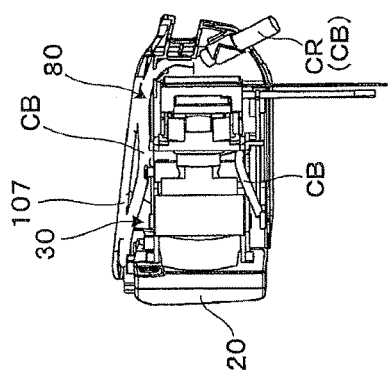
FIG. 8D is a side view.

Hereinafter, a description will be given in relation to features of an appearance of assembling the cables CB as described above, with reference to FIGS. 8A to 8D. FIGS. 8A and 8B are diagrams showing assembly of the internal structure in a case where the cables CB are not assembled, and FIGS. 8C and 8D are diagrams showing assembly of the internal structure in a case where the cables CB are assembled. As shown in the drawings, the cables CB are arranged along the cable cover portion 108a and the guide groove 108x. With such a configuration, presence or non-presence of the cables CB does not cause an increase in size of the apparatus and does not affect the appearance as is obvious from comparison with FIG. 8A and the like. In addition, the cables CB are accommodated without affecting the image formation and the see-through property.

Figure 9:
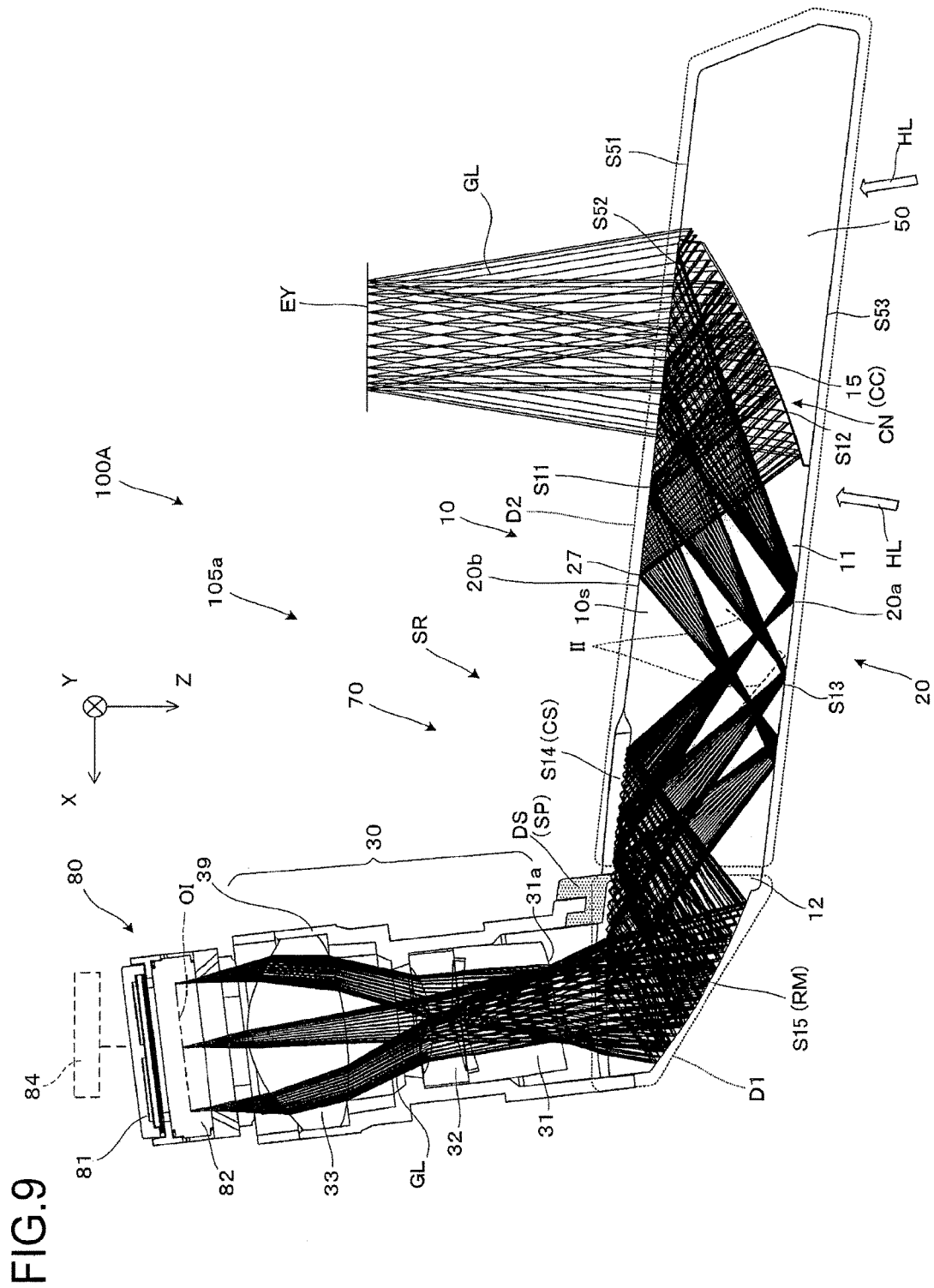
FIG. 9 is a diagram showing an optical path of video image light in the virtual image display apparatus.

Hereinafter, a detailed description will be given of an optical configuration of the virtual image display apparatus 100 with reference to FIG. 9. As the assumption, a detailed description will be given of the image display device 80 and the projector lens 30 which configure the first image formation main body portion 105a (see FIG. 1) first.

The image display device 80 includes an illumination device 81 for emitting illumination light to the video image display element 82 and a drive control unit 84 for controlling operations of the illumination device 81 and the video image display element 82 in addition to the aforementioned video image display element 82 as shown in the drawing.

The illumination device 81 of the image display device 80 includes a light source which generates light including three colors, namely red, green, and blue and a backlight guiding portion which disperses the light from the light source and forms a light flux with a rectangular cross section. The video image display element (video image element) 82 is formed of a liquid crystal display device, for example, is configured of a plurality of pixels, and forms image light as a display target, such as a moving image, by spatially modulating the illumination light from the illumination device 81. The drive control unit 84 is configured of a liquid crystal drive circuit which forms color video image light or image light as a transmittance pattern which functions as a source of a moving image or a stationary image by outputting an image signal or a drive signal to a light source drive circuit which supplies power to the illumination device 81 and causes the illumination device 81 to emit illumination light with stable luminance and the video image display element (video image element) 82 although not shown in the drawing. In addition, it is possible to provide an image processing function to the liquid crystal drive circuit, or alternatively, it is also possible to provide the image processing function to an external control circuit.

The projector lens 30 is a projection optical system which includes, as constituent elements, three optical elements (lenses) 31 to 33 along an optical axis on the incident side, and is supported by the lens barrel portion 39 accommodating these optical elements 31 to 33. Each of the optical elements 31 to 33 is an aspherical lens including both a non-axisymmetric aspherical surface and an axisymmetric aspherical surface, and cooperates with a part of the light guiding member 10 to form an intermediate image, which corresponds to a display image of the video image display element 82, inside the light guiding member 10. In the respective lenses (optical elements) 31 to 33, a lens surface 31a as a light outgoing surface of the first lens 31 is a non-axisymmetric aspherical surface, and lens surfaces other than the lens surface 31a are axisymmetric aspherical surfaces.

Hereinafter, a detailed description will be given of the light guiding device 20 and the like. As described above, the light guiding device 20 is configured of the light guiding member 10 and the light transmitting member 50. Among the light guiding member 10 and the light transmitting member 50, the light guiding member 10 has a portion, which linearly extends, on the center side (in front of the eyes) close to the nose in a planar view. The first light guiding portion 11, which is arranged on the center side close to the nose, namely on the light outgoing side, in the light guiding member 10 includes, as side surfaces with optical functions, a first surface S11, a second surface S12, and a third surface S13. The second light guiding portion 12 which is arranged on a peripheral side separated from the nose, namely on the light incident side includes, as side surfaces with optical functions, a fourth surface S14 and a fifth surface S15. Among the side surfaces, the first surface S11 and the fourth surface S14 are continuously adjacent to each other, and the third surface S13 and the fifth surface S15 are continuously adjacent to each other. In addition, the second surface S12 is arranged between the first surface S11 and the third surface S13, and the fourth surface S14 and the fifth surface S15 are adjacent to each other at a large angle. Furthermore, the first surface S11 and the third surface S13 which are arranged so as to face each other have substantially parallel planar shapes here. In contrast, the other surfaces with the optical functions, namely the second surface S12, the fourth surface S14, and the fifth surface S15 are non-axisymmetric spherical surfaces (free spherical surfaces). As described above, the third surface S13 configures the first exposed surface 20a, and the first surface S11 and the fourth surface S14 configure the second exposed surfaces 20b.

In addition, the light guiding member 10 is joined to the light transmitting member 50 via an adhesive layer CC, and a portion configured of the joining surface between the light guiding member 10 and the light transmitting member 50 and the adhesive layer CC will be referred to as a joining portion CN in the light guiding device 20. In addition, the light guiding device 20 is formed by joining a base material of the light guiding member 10 and the light transmitting member 50 at the joining portion CN and then coating the joined base material by dip processing. That is, a hard coating layer 27 of the light guiding member 10 is provided on the light transmitting member 50 and the entire light guiding device 20.

In addition, the surfaces S14 and S15 other than the first surface S11 to the third surface S13 from among the plurality of surfaces which configure the light guiding member 10 include at least one point with different curvature symbols depending on directions in at least one free spherical surface. With such a configuration, it is possible to precisely control the guiding of the video image light and to reduce the size of the light guiding member 10.

A main body 10s of the light guiding member 10 is formed of a resin material which has a high light transmitting property in a visible region and is molded by injecting and solidifying thermoplastic resin in a mold, for example. As a material of the main body 10s, it is possible to use cycloolefin polymer, for example. Although the main body 10s is formed as an integrally formed article, the light guiding member 10 can be considered by being functionally divided into the first light guiding portion 11 and the second light guiding portion 12 as described above. The first light guiding portion 11 enables wave guiding and emission of video image light GL and enables visualization of external light HL. The second light guiding portion 12 enables incidence and wave guiding of the video image light GL.

In the first light guiding portion 11, the first surface S11 functions as a refraction surface which emits the video image light GL to the outside of the first light guiding portion 11 and also functions as a full reflective surface which fully reflects the video image light GL on the inner surface side. The first surface S11 is arranged in front of the eyes EY and has a planar shape as described above. In addition, the first surface S11 is a surface formed of the hard coating layer 27 provided on the surface of the main body 10s.

The second surface S12 is a surface of the main body 10s and includes a half mirror layer 15 additionally provided thereon. The half mirror layer 15 is a reflective film with a light transmitting property (that is, a semi-transmitting reflective film). The half mirror layer (semi-transmitting reflective film) 15 is formed on a partial region (omitted in the drawing), which is obtained by narrowing the second surface S12 in the vertical direction along the Y axis, instead of the entirety of the second surface S12. The half mirror layer 15 is formed by forming a metal reflective film and a dielectric body multilayered film on the partial region PA on a base coating surface of the main body 10s. A reflection rate of the half mirror layer 15 with respect to the video image light GL is set to be equal to or greater than 10% and equal to or less than 50% in an assumed incident angle range of the video image light GL in terms of facilitating the viewing of the external light HL by the see-through property. A reflection rate of the half mirror layer 15 according to a specific embodiment with respect to the video image light GL is set to 20%, for example, and transmittance thereof with respect to the video image light GL is set to 80%, for example.

The third surface S13 functions as a full reflective surface which fully reflects the video image light GL on the inner surface side. The third surface S13 is arranged substantially in front of the eyes EY, has a planar shape in the same manner as the first surface S11, has a diopter scale of 0 when the external light HL is viewed by causing the external light HL to pass through the first surface S11 and the third surface S13, by the configuration in which the first surface S11 and the third surface S13 are mutually parallel surfaces, and does not particularly cause any variable power. In addition, the third surface S13 is a surface formed by the hard coating layer 27 which is provided on the surface of the main body 10s.

In the second light guiding portion 12, the fourth surface S14 functions as a full reflective surface which fully reflects the video image light GL on the inner surface side. The fourth surface S14 also functions as a refractive surface which causes the video image light GL to be incident on the inside of the second light guiding portion 12. That is, the fourth surface S14 functions both as a light incident surface which causes the video image light GL to be incident on the light guiding member 10 from the outside and as a reflective surface which delivers the video image light GL inside the light guiding member 10. In addition, the fourth surface S14 is a surface formed by the hard coating layer 27 which is provided on the surface of the main body 10s.

In the second light guiding portion 12, the fifth surface S15 is formed by forming a light reflective film RM formed of an inorganic material on the surface of the main body 10s and functions as a reflective surface.

The light transmitting member 50 forms one light guiding device 20 which is integrally fixed to the light guiding member 10 as described above and is a member (assistant optical block) which assists the visualization function of the light guiding member 10. The light transmitting member 50 includes the first transmitting surface S51, the second transmitting surface S52, and the third transmitting surface S53 as side surfaces with optical functions. Here, the second transmitting surface S52 is arranged between the first transmitting surface S51 and the third transmitting surface S53. The first transmitting surface S51 is on a plane obtained by extending the first surface S11 of the light guiding member 10, the second transmitting surface S52 is a spherical surface which is joined to and integrated with the second surface S12 with the adhesive layer CC, and the third transmitting surface S53 is on a plane obtained by extending the third surface S13 of the light guiding member 10. Among the surfaces, the second transmitting surface S52 and the second surface S12 of the light guiding member 10 are integrated by being joined via the thin adhesive layer CC and thus have shapes with substantially the same curvature.

The light transmitting member (assistant optical block) 50 has a high light transmitting property in the visible region, and a main body portion of the light transmitting member is formed of a thermoplastic resin material with substantially the same refractive index as that of the main body 10s of the light guiding member 10. In addition, the light transmitting member 50 is formed by joining the main body portion thereof to the main body 10s of the light guiding member 10 and forming a film by hard coating along with the main body 10s in the joined state. That is, the light transmitting member 50 has the main body portion with the surface on which the hard coating layer 27 is provided in the same manner as the light guiding member 10. The first transmitting surface S51 and the third transmitting surface S53 are surfaces which are formed by the hard coating layer 27 provided on the surface of the main body portion.

Among components which configure the dust proofing structure DS, the sealing member SP which is in contact with the fourth surface S14 is a variable elastic member, and therefore, it is possible to maintain reliable sealing even in a case where the fourth surface S14 as a partially covered optical surface CS which is arranged from a region covered with the lens barrel portion 39 to a region not covered with the lens barrel portion 39 is a non-axisymmetric spherical surface, that is a free spherical surface.

Hereinafter, a specific description will be given of an optical path of the video image light GL and the like in the virtual image display apparatus 100. The video image light GL emitted from the video image display element (video image element) 82 is converged by being made to pass through the respective lenses 31 to 33 which configure the projector lens 30, a prescribed astigmatism is applied thereto, and the video image light GL is then incident on the fourth surface S14 with a positive refractive power which is provided at the light guiding member 10. In addition, the astigmatism is offset while the video image light GL passes through the respective surfaces of the light guiding member 10, and the video image light is finally emitted in the initial state toward the eyes of the viewer.

The video image light GL after being incident on and passing through the fourth surface S14 of the light guiding member 10 advances while being converged, is reflected by the fifth surface S15 with a relatively weak positive refractive power when passing through the second light guiding portion 12, is incident again on the fourth surface S14 from the inside, and is reflected by the fourth surface S14.

The video image light GL reflected by the fourth surface S14 of the second light guiding portion 12 is incident on and fully reflected by the third surface S13, which has substantially no refractive power, at the first light guiding portion 11, and is incident on and fully reflected by the first surface S11 which has substantially no refractive power.

Here, the video image light GL forms an intermediate image in the light guiding member 10 before or after passing through the third surface S13. An image plane II of the intermediate image corresponds to an image plane OI of the video image display element 82. In addition, the image plane II of the intermediate image shown in the drawing is formed in the optical path of the video image light from the third surface S13 to the fourth surface S14 on a side closer to the third surface S13 than to the fourth surface S14. That is, the image plane II is distant from the fourth surface S14. With such a configuration, even if the components of the video image light are slightly absorbed by the sealing member SP, it is possible to suppress the level of absorption to a level in which the viewer does not feel that the visually recognized image becomes dark due to the absorption.

The video image light GL which is fully reflected by the first surface S11 is incident on the second surface S12. However, the video image light GL which is incident on the half mirror layer 15, in particular, partially transmits through the half mirror layer 15, is partially reflected by the half mirror layer 15, and is incident on and transmits through the first surface S11 again. In addition, the half mirror layer 15 acts on the video image light GL reflected by the half mirror layer 15 as a half mirror layer with a relatively strong positive refractive power. In addition, the first surface S11 acts on the video image light GL which passes through the first surface S11 as a surface with no refractive power.

The video image light GL which passes through the first surface S11 is incident on pupils of the eyes EY of the viewer or on an equivalent position thereof as substantially parallel light flux. That is, the viewer views an image formed on the video image display element (video image element) 82 by the video image light GL as a virtual image.

In contrast, a part of the external light HL, which is incident on the further +X side than the second surface S12 of the light guiding member 10 passes through the third surface S13 and the first surface S11 of the first light guiding portion 11. However, substantially no aberration occurs at this time since the third surface S13 and the first surface S11 are substantially parallel planes. That is, the viewer views an external image through the light guiding member 10 with no strain. Similarly, a part of the external light HL, which is incident on the further −X side than the second surface S12 of the light guiding member 10, that is, the part which is incident on the light transmitting member 50 does not cause aberration when passing through the third transmitting surface S53 and the first transmitting surface S51 provided at the light guiding member 10 since the third transmitting surface S53 and the first transmitting surface S51 are substantially parallel planes. That is, the viewer views the external image through the light transmitting member 50 with no strain. Furthermore, a part of the external light HL, which is incident on the light transmitting member 50 corresponding to the second surface S12 of the light guiding member 10, causes substantially no aberration when passing through the third transmitting surface S53 and the first surface S11 since the third transmitting surface S53 and the first surface S11 are substantially parallel planes. That is, the viewer views the external image through the light transmitting member 50 with a small amount of strain. In addition, both the second surface S12 of the light guiding member 10 and the second transmitting surface S52 of the light transmitting member 50 have substantially the same spherical shapes and have substantially the same refractive indexes, and a gap therebetween is filled with the adhesive layer CC with substantially the same refractive index. That is, the second surface S12 of the light guiding member and the second transmitting surface S52 of the light transmitting member 50 do not act as refractive surfaces on the external light HL.

However, the external light HL which is incident on the half mirror layer 15 partially transmits through the half mirror layer 15 and is partially reflected by the half mirror layer 15. Therefore, the external light HL from a direction corresponding to the half mirror layer 15 is weakened by the transmittance of the half mirror layer 15. In contrast, since the video image light GL is incident from the direction corresponding to the half mirror layer 15, the viewer views both the image formed on the video image display element (video image element) 82 and the external image in the direction of the half mirror layer 15.

A part, which is not reflected by the half mirror layer 15, of the video image light GL which is delivered to the light guiding member 10 and is incident on the second surface S12 is incident on the light transmitting member 50. However, the part of the video image light GL is prevented from returning to the light guiding member 10 by a reflection preventing portion which is provided in the light transmitting member 50 and is not shown in the drawing. That is, the video image light GL which transmits through the second surface S12 is prevented from returning to the optical path and becoming stray light. In addition, the external light HL which is incident from the side of the light transmitting member 50 and is reflected by the half mirror layer 15 is returned to the light transmitting member 50. However, the external light HL is prevented from being emitted to the light guiding member 10 by the aforementioned reflection preventing portion which is provided in the light transmitting member 50 and is not shown in the drawing. That is, the external light HL reflected by the half mirror layer 15 is prevented from returning to the optical path and becoming stray light.

As described above, the virtual image display apparatus 100 according to the embodiment has a see-through configuration, and it is possible to concentrate the end portions of the cables CB on one of the right and left sides (at a location on the left eye side in the example shown in the drawings), that is, it is possible to integrate the cables by arranging the cables CB, which transmit video signals to the pair of video image display elements (video image elements) 82 arranged on the right and left sides, along the frame 107 for supporting the pair of right and left light guiding devices 20. At this time, it is possible to suppress an increase in size which accompanies cable arrangement and to implement the apparatus as a whole in a small body by accommodating the cables CB in the cable cover portion 108a, which extends along the frame 107, in the cover inside 108.

Others Configurations

Although the invention was described above based on the respective embodiments, the invention is not limited to the aforementioned embodiments and can be implemented in various states without departing from the gist of the invention. For example, the following modifications can be made.

Although the cables CB are accommodated at a location (the cable fixation portion CR) on the left eye side, a configuration in which the cables are accommodated on the right eye side is also applicable. In addition, a configuration in which the cables CB are extracted from the back of the head near the temples 104 is also applicable.

Although dust proofing and water proofing is achieved inside the frame portion 102 by providing the fitting structure between the cover inside 108 for accommodating the cables CB and the frame 107 in the aforementioned embodiment, the invention is not limited to the case of providing the fitting structure, and a configuration in which the cover inside 108 and the frame 107 are brought into a fitting state by various methods such as screwing is also applicable.

Although the cover inside 108 which covers the inner portion near the viewer is assumed to be a cover which covers the cables CB in the aforementioned embodiment, the cover which covers the cables CB is not limited thereto, and various configurations are applicable. For example, a configuration in which the cables CB are covered with a cover with a configuration of covering up to an outer portion far from the viewer, for example, is also applicable.

Although the projector lens has one non-axisymmetric aspheric surface in the above description, the projector lens can have two or more non-axisymmetric aspheric surfaces.

Although the half mirror layer (semi-transmitting reflective film) 15 is formed in a horizontally elongated rectangular region in the above description, the outline of the half mirror layer 15 can be appropriately modified in accordance with the purpose thereof and other specifications. In addition, the transmittance and the reflection rate of the half mirror layer 15 can be changed in accordance with the purpose thereof and other specifications.

Although distribution of display luminance in the video image display element 82 is not particularly adjusted in the above description, it is possible to irregularly adjust the distribution of the display luminance in a case where a difference occurs in luminance depending on a position.

Although the video image display element 82 configured of a transmissive liquid crystal display device or the like is used as the image display device 80 in the above description, the image display device 80 is not limited to the video image display element 82 configured of the transmissive liquid crystal display device or the like, and various kinds of image display devices can be used. For example, a configuration of using a reflective liquid crystal display device is also applicable, and it is also possible to use a digital micro mirror device or the like instead of the video image display element 82 configured of the liquid crystal display device or the like. In addition, it is also possible to use a self-emitting element, representative examples of which include an LED array and an organic EL (OLED), as the image display device 80.

Although the image display device 80 configured of the transmissive liquid crystal display device or the like is used in the above embodiment, it is also possible to use a scanning-type image display device instead of the transmissive liquid crystal display device.

In addition, although the above embodiment employs the configuration in which the light guiding member 10 and the light transmitting member 50 as the assistant optical block cover the entirety of the front side of the eyes EY of the wearer thereof, the invention is not limited thereto. A configuration in which a part including the second surface S12 with the spherical surface including the half mirror layer 15 covers a part of the eyes EY, namely a small-sized configuration in which a part of the front side of the eyes is covered and an uncovered is also present is also applicable.

Although the half mirror layer 15 is configured of the semi-transmitting film (for example, a metal reflective film or a dielectric body multilayered film) in the above description, it is possible to replace the half mirror layer 15 with a hologram element with a planar surface or a spherical surface.

Although the light guiding members 10 and the like extend in the horizontal direction as an alignment direction of the eyes EY in the above description, it is possible to arrange the light guiding member 10 so as to vertically extend. In such a case the light guiding member 10 has a structure of being arranged not in series but in parallel.

What is claimed is:

1. A head mounted display comprising:
a first image display device that generates a first image light;
a second image display device that generates a second image light;
a first optical system that deflects the first image light from the first image display device;
a second optical system that deflects the second image light from the second image display device;
a frame portion including a first supporting portion and a second supporting portion; and
a first cable that transmits a signal to the first image display device,
wherein the first supporting portion supports the first optical system, and the second supporting portion supports the second optical system, and
wherein at least a first portion of the first cable is located within the second supporting portion.

2. The head mounted display according to claim 1,
wherein a direction of an incident first image light is different from a direction of a deflected first image light, and
wherein a direction of an incident second image light is different from a direction of a deflected second image light.

3. The head mounted display according to claim 2,
wherein a position of the incident first image light is different from a position of the deflected first image light, and
wherein a position of the incident second image light is different from a position of the deflected second image light.

4. The head mounted display according to claim 3,
wherein the first optical system includes a first light guiding device that guides the first image light by reflecting on an inner surface of the first light guiding device, and
wherein the second optical system includes a second light guiding device that guides the second image light by reflecting on an inner surface of the second light guiding device.

5. The head mounted display according to claim 1,
wherein the frame portion includes a center portion which is provided between the first supporting portion and the second supporting portion, and
wherein at least a second portion of the first cable is located within the center portion from the second supporting portion.

6. The head mounted display according to claim 5,
wherein the first cable includes a center cable portion that is located within the center portion.

7. The head mounted display according to claim 1,
wherein the frame portion includes a front side frame portion and a rear side frame portion, and
wherein the first cable is located between the front side frame portion and the rear side frame portion.

8. The head mounted display according to claim 7,
wherein the frame portion includes a groove portion along the frame portion, and
wherein the cable is located to the inside of the groove portion.

9. The head mounted display according to claim 1,
wherein the first cable is located above the second optical system.

10. The head mounted display according to claim 1, further comprising:
a second cable that transmits a signal to the second image display device.

11. The head mounted display according to claim 10,
wherein the second supporting portion includes an output portion, and
wherein each of the first cable and the second cable outputs from the output portion.

12. The head mounted display according to claim 5,
wherein each of the first cable and the second cable outputs from a bottom of the second supporting portion.

13. The head mounted display according to claim 1,
wherein the first cable has a first sub cable and a second sub cable.

14. The head mounted display according to claim 1,
wherein the first cable is a flexible cable.

15. The head mounted display according to claim 1, further comprising a camera,
wherein the camera is located in the frame portion, and
wherein the first cable includes a camera cable that transmits an image signal from the camera.

16. The head mounted display according to claim 15, further comprising a display lamp that emits light to indicate that the camera is being operated,
wherein the display lamp is located in the frame portion near the camera, and wherein the first cable includes a display lamp cable that transmits a signal to the display lamp.

17. A head mounted display comprising:
a first image display device that generates a first image light;
a second image display device that generates a second image light;
a first optical system that deflects the first image light from the first image display device;
a second optical system that deflects the second image light from the second image display device;
a frame portion that supports the first optical system and the second optical system; and
a cable that transmits a signal to the first image display device,
wherein the cable is located within the frame portion.

18. A head mounted display comprising:
a first image display device that generates a first image light;
a second image display device that generates a second image light;
a first optical system that deflects the first image light from the first image display device;
a second optical system that deflects the second image light from the second image display device;
a camera;
a frame portion that supports the first optical system and the second optical system; and
a camera cable which transmits image signal from the camera,
wherein a position of the camera is closer to the first optical system than to the second optical system, and
wherein the camera cable is located within the frame portion.

19. A head mounted display to which a source is connected, the head mounted display comprising:
a first image formation main body having a first display device, the first display device generating a first image light;
a second image formation main body having a second display device, the second display device generating a second image light;
a first optical system that deflects the first image light from the first image display device;
a second optical system that deflects the second image light from the second image display device;
a cover inside that is arranged along a direction in which the first optical system and the second optical system are aligned;
a first cable portion including a connecting portion which is configured to be connected to the source;
a second cable portion that transmits a first signal to the first image display device; and
a third cable portion that transmits a second signal to the second image display device,
wherein the first cable portion is extracted from the first image formation main body, and
wherein the cover inside accommodates the third cable portion along the direction.

20. The head mounted display according to claim 19, wherein the first image formation main body includes a cable fixation portion, the first cable portion accommodated at a location in which the cable fixation portion is disposed.

21. The head mounted display according to claim 19, wherein
the second cable portion is connected to the first image display in the first image formation main body, and
the third cable portion is connected to the second image display in the second image formation main body, the third cable portion is extracted from the second image formation main body, and the third cable portion enters the first image formation main body.

* * * * *